T. PROSSER.
EXPANDING DRILL.
No. 9,562.  Patented Jan. 25, 1853.
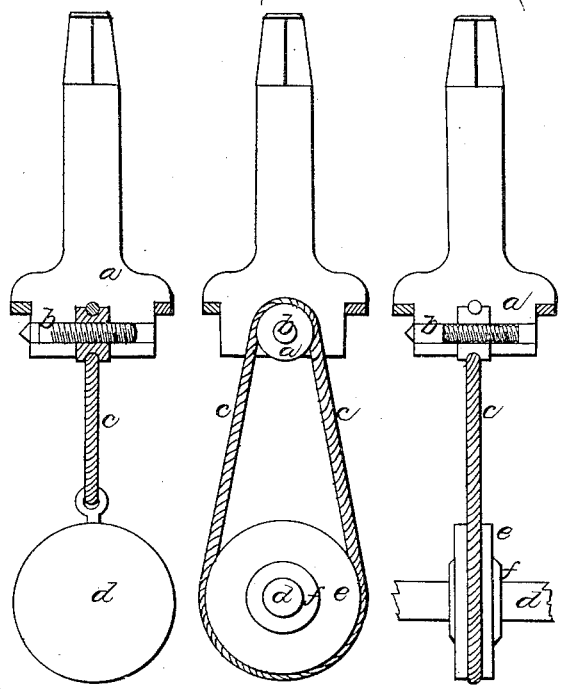
Inventor:
Thomas Prosser

UNITED STATES PATENT OFFICE.

THOMAS PROSSER, OF NEW YORK, N. Y.

EXPANDING DRILL.

Specification of Letters Patent No. 9,562, dated January 25, 1853.

*To all whom it may concern:*

Be it known that I, THOMAS PROSSER, of the city, county, and State of New York, have invented a new and Improved Expansion-Drill; and I do hereby declare that the following is a full and exact description thereof, reference being had to the accompanying drawings and to the letters of reference marked thereon.

The nature of my invention consists in the combination of mechanism for producing a continuous expansion in the cutting part of a chambering drill when in motion, and thereby enabling the operator to enlarge holes previously made in metallic substances, within the thickness thereof, technically called chambering, without changing the cutter or stopping the drill.

The continuous expansion is accomplished in the simplest form in Figure 1, of the sheet hereunto attached, (and forming part of this specification,) by means of a tapped nut $a$ turning around upon the cutter $b$, which has a screw cut upon it corresponding thereto.

The cutter $b$, is here shown horizontal and up to its work, that is to say in the act of cutting or drilling the hole in part of a plate of metal, to a larger diameter within the thickness of same, that being the purpose to which it is particularly applicable. The nut $a$ is made to revolve by means of a band or cord $c$ wound around it and from which a weight $d$ may be suspended, proportioned to the cut intended to be made. The same object may be obtained as shown in Fig. 2, by means of an endless band or chain $c$, embracing the nut $a$, and roller $e$, the latter being turned by means of the handwheel $f$, or, in any other of the various ways, which will readily suggest themselves.

Another method is shown in Fig. 3, a tangent screw $c$, on the end of which there is a bevel pinion $d$ (or a milled head if to be worked by hand) operated upon by means of a bevel crown wheel $l$, which being held by the hand, or a friction band embracing the hub $f$, will give the requisite motion to the nut $a$ which has a worm screw cut upon its periphery corresponding with the tangent screw $c$ and cutter $b$, by the revolutions of the drill.

Fig. 4 is another method in which two bevel wheels $a$ and $c$ work in a similar manner to the bevel wheels in Fig. 3, but the bevel wheel $a$ is also equivalent to the nut $a$ of Fig. 1, with this difference, this plan resolves itself into as few moving parts as Fig. 1, $b$, being the cutter and $d$ the hub of the bevel wheel $c$, which may be held by hand or a friction band as before stated in reference to Fig. 3. In this figure the cutter is oblique to the axis of the drill which appears to be the best position to make good and clean work.

Fig. 5, also shows the adoption of the oblique position of the drill instead of the horizontal one of Fig. 3, to the same method of gearing and which only requires that the worm wheel $d$, Fig. 3, should be placed obliquely as at $a$, Fig. 5, to show the (otherwise) identity of the two methods. Fig. 6, however under all the circumstances appears to be the most desirable, simple and compact taken in connection with the practical requirements of the depth of the cut and strength of the working parts.

The expansion bar $b$, is moved to and fro by means of the nut $a$ in the same manner as before described as applied to the cutter in Figs. 1, 2, 3, 4 and 5 but more particularly as to Fig. 5. Now the nut $a$ in addition to being tapped for the screw of the expansion bar to work in, has teeth cut upon its periphery in an oblique direction in such a manner as to gear into a horizontal internal worm wheel $c$, for which purpose the axis of the nut $a$ and cutter $b$ must pass the axis of the worm wheel $c$ or be somewhat eccentric thereto where they would otherwise cross each other and of course the nut must be less in diameter over all than the worm wheel on the pitch line thereof in order to avoid gearing into both sides. This form of the drill presents no projecting parts whatever except the cutter and that part of the expansion bar to which it is attached by means of screws or otherwise.

Having now described several means of applying my invention I do not profess to conform myself to any of them as to the mere mode of operating the screw and thereby causing the cutter to advance or expand simultaneously with the operation of cutting or drilling.

What I claim and desire to secure by Letters Patent is—

The combination of the inclined cutter $b$, with a screw cut thereon, bevel screw pinion or its equivalent and collar $c$, arranged in the manner described, so that by holding said collar during the rotation of the drill, a continuous feed motion is communicated to the cutter.

THOS. PROSSER.

Witnesses:
   THOS. PROSSER, Jr.,
   ALLEN MOORE.